Oct. 4, 1949.    L. WELLS ET AL    2,483,683
POTATO VINE CUTTER
Filed Dec. 10, 1946    2 Sheets-Sheet 2
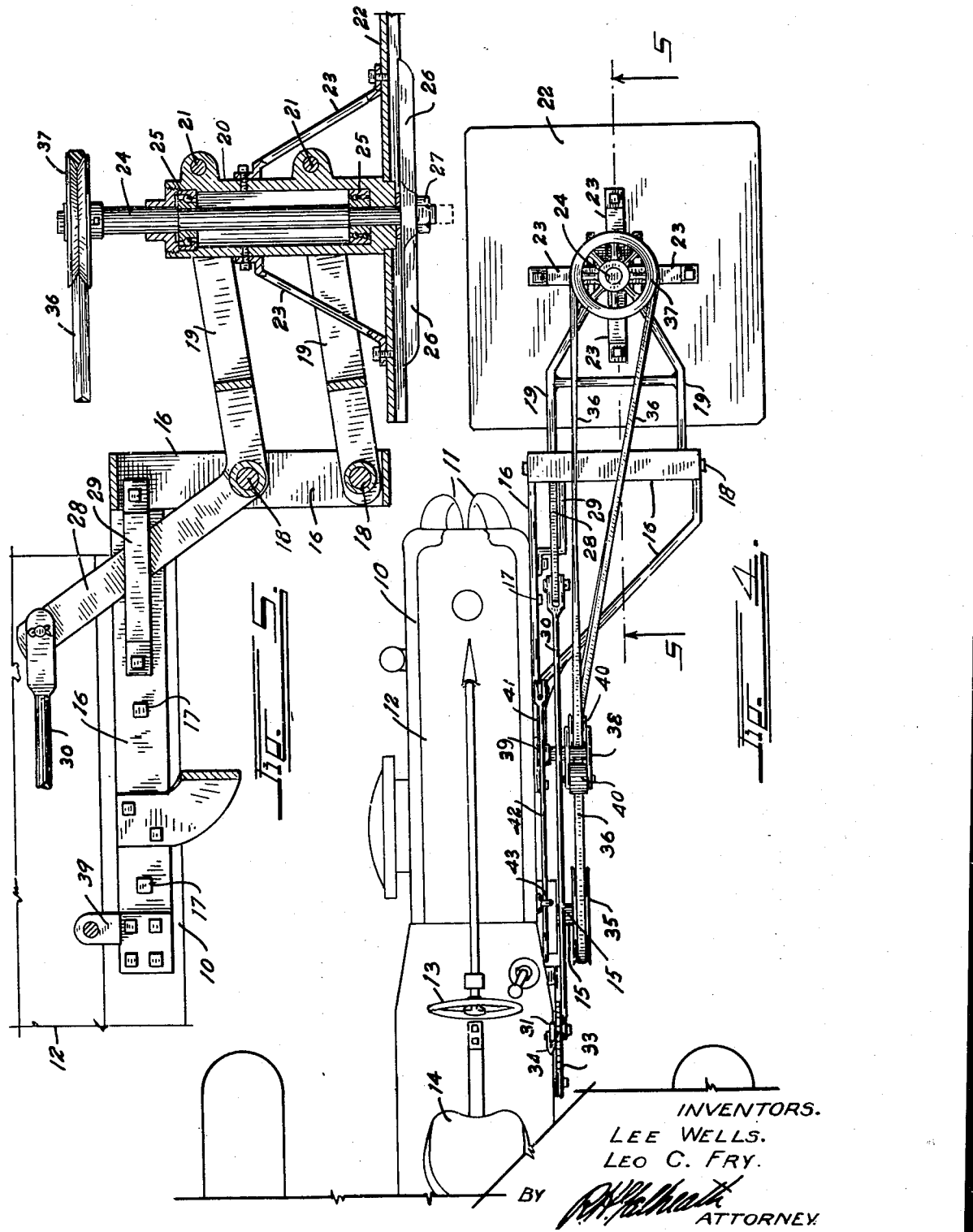
INVENTORS.
LEE WELLS.
LEO C. FRY.
BY
ATTORNEY.

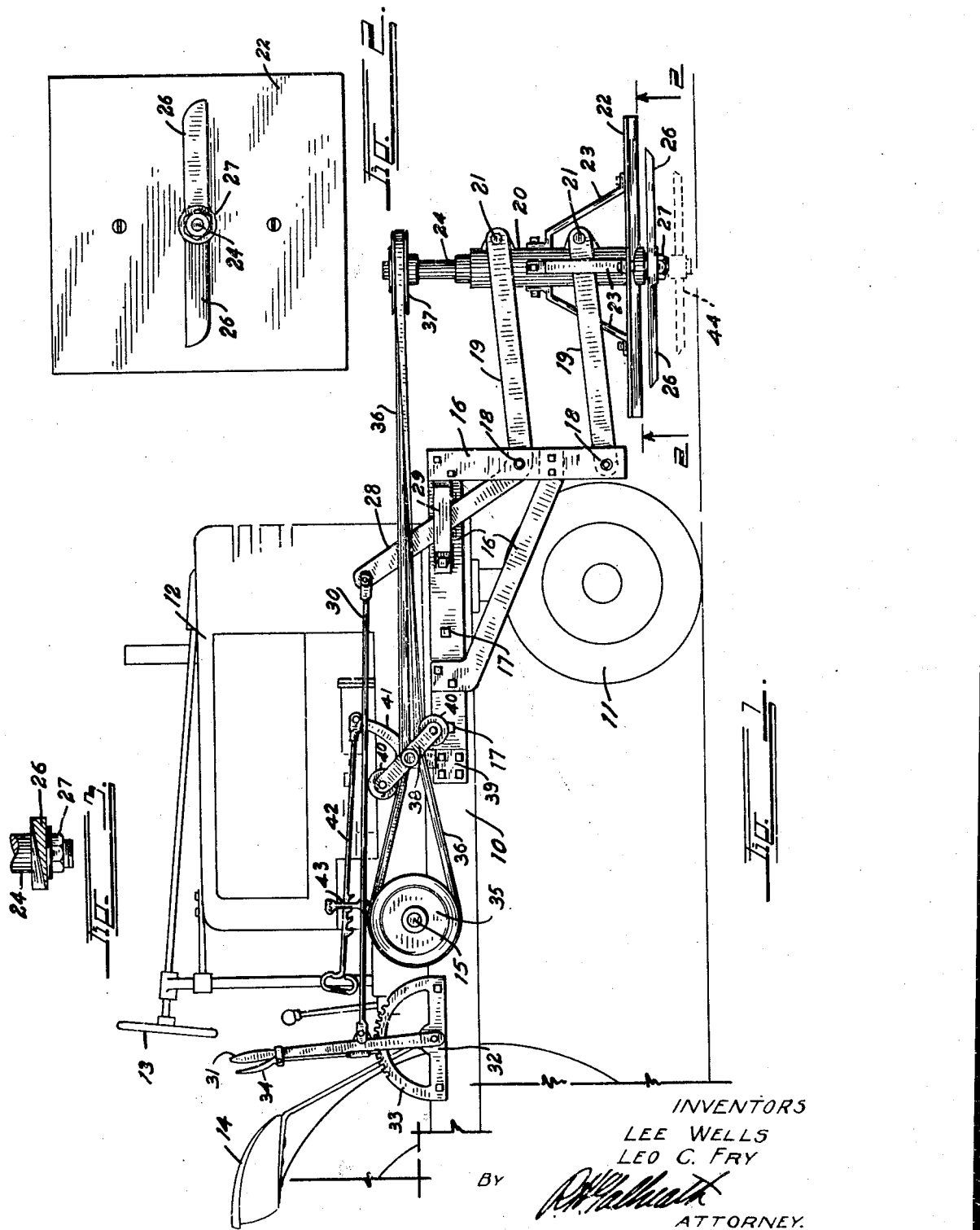

Patented Oct. 4, 1949

2,483,683

UNITED STATES PATENT OFFICE 2,483,683

POTATO VINE CUTTER

Lee Wells and Leo C. Fry, Gering, Nebr.

Application December 10, 1946, Serial No. 715,256

2 Claims. (Cl. 56—25.4)

This invention relates to a potato vine cutter. If potato vines are cut with a sickle or the like they must be raked from the rows for if allowed to lie on the fields in long lengths they drag, accumulate on and clog the potato digging plows.

The principal object of this invention is to provide a de-vining attachment which will chop, cut, and break the potato vines into exceedingly small pieces so that they will not clog the digging plows, and so that they may be left on the field to provide fertilizer.

Another object of the invention is to so construct the device that it will be comparatively light-weight and easily portable and easily attached to any desired motor vehicle for carrying it along the potato rows.

While the invention has been particularly designed for attachment to a tractor of a type having a power take-off, it could be provided with power and used as a separate implement, if desired.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side view of the improved vine cutting and chopping device;

Fig. 2 is a fragmentary bottom view, looking upwardly on the line 2—2, Fig. 1;

Fig. 3 is an enlarged, detail cross-section through a cutter blade employed in the invention;

Fig. 4 is a plan view of the improved vine cutter, illustrating it applied to a typical tractor; and Fig. 5 is an enlarged, vertical, longitudinal section therethrough, taken on the line 5—5, Fig. 4.

In the drawing, parts of a typical farm tractor are designated by numeral as follows: chassis frame 10, front guide wheels 11, engine hood 12, steering wheel 13, seat 14, and power take-off shaft 15.

The improved potato vine cutter is supported from a supporting frame 16 which is L-shaped in plan in order that it may be bolted to the right side of the chassis frame 10 by means of suitable bolts 17 so as to project forwardly and to the right thereof. The frame 16 carries two parallel, horizontal hinge shafts 18, from each of which an A-shaped hinged frame 19 projects forwardly.

The frames 19 support a vertical shaft sleeve 20 by means of forward hinge pins 21. The hinge pins 21 are positioned vertically over each other and are spaced the same as the shafts 18 so that the frames 19 will always maintain their parallel relation, and in turn will always maintain the sleeve 20 in a vertical position.

The sleeve 20 supports at its bottom a press plate 22 which is secured to the sleeve 20 at its middle and is braced therefrom by means of four diagonal braces 23. The press plate 22 is substantially horizontal. However, it is preferred to incline it upwardly at its right edge, as indicated on the drawing.

A vertical cutter shaft 24 is mounted in suitable thrust bearings 25 in the sleeve 20 so as to project above and below the latter. A cutter blade 26 extends diametrically across the lower extremity of the shaft 24 and is secured thereto by means of a jam nut 27. The cutter blade 26 is formed from a solid hardened steel bar which is sharpened on its advancing edge, as shown in Fig. 3. The plane of rotation of the cutter blade 26 is horizontal and in relatively close spaced relation to the press plate 22.

The weight of the sleeve 20 is adjustably supported by means of a lever arm 28 which is fixedly secured to, or formed on, the upper hinged frame 19 so as to project above the frame 16 through a guide strap 29 mounted thereon. A connecting rod 30 is hinged to, and extends rearwardly from, the lever arm 28 to a height-adjusting hand lever 31 mounted on the tractor in any desired manner, such as by means of a hinge plate 32. The hand lever 31 is provided with the usual notched sector 33 and latch 34 for latching it in any desired position.

It can be readily seen that, if the lever 31 be swung forwardly and backwardly, it will act through the medium of the connecting rod 30 to raise and lower the sleeve 20, and with it, the press plate 22 and the cutter blade 26.

The shaft 24 may be driven in any desired manner. It is preferably driven from the power take-off of the tractor. The tractor illustrated is of the type having a power take-off shaft 15 projecting from the side thereof. A belt pulley 35 is mounted on the shaft 15 and an endless belt 36, preferably of the V type, extends from the pulley 35 around a drive pulley 37 mounted on the upper extremity of the shaft 24. The belt 36 is sufficiently long so that the upward and downward movement of the shaft 24 does not affect its alignment with the pulleys.

The tension in the belt is regulated by means of a rocking arm 38 mounted on a suitable bracket 39 on the side of the chassis frame 10. The rocking arm carries two idler pulleys 40 which are brought against the two reaches of the belt by tilting the arm 38. The arm is tilted through the medium of a lever 41 formed thereon and projecting upwardly therefrom. A pull rod 42 provided with latching means 43 extends to a position convenient to the operator.

The efficiency of the improved vine cutter is due primarily to the press plate 22. This plate is adjusted vertically to place it relatively close to the ground, and as the tractor is driven forwardly along the row, the plate 22 crushes the vines downwardly into a matted mass between the plate 22 and the ground. The cutting blade 26 rotates at relatively high speed within this matted mass of vines so as to break and cut them into very short lengths, due to their folded and entwined condition.

The pressure on the mass of vines is slightly less to the right side of the plate, due to the upward incline at this side, and the blade 26 rotates toward the right at its forward side so as to throw the cut vines toward this side of the plate. Thus the chopped vines flow from beneath the plate 22 to the right of the tractor in a windrow alongside the row being cut.

The rapid rotation of the cutter blade in the mass of cut vines creates a vortex or partial vacuum at the axis of rotation which assists in drawing the vines into the zone of action of the cutter blade. This is of course due to the press plate 22 which prevents air from entering from the top.

It has been found that in some cases where the vines are exceedingly thick and heavy, the efficiency of the machine can be increased by adding a second cutting blade thereto below the first blade, as indicated in broken line at 44 in Fig. 1.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A potato vine cutter comprising: a supporting frame; means for attaching said frame to a tractor; parallel frames hinged at their rearward extremities to said supporting frame and extending forwardly therefrom in parallel relation; a shaft sleeve hingedly mounted on the forward extremities of said parallel frames so as to maintain itself vertical at all elevations; a substantially horizontal press plate secured at its middle to the lower extremity of said sleeve so as to extend in all directions therefrom; a blade shaft rotatably mounted in said sleeve and extending above and below the latter; a diametrically extending cutting blade mounted on the lower extremity of said blade shaft below said plate; means for rotating said blade shaft; and means for swinging said parallel frames in a vertical plane, said plate being inclined slightly upward toward the side away from said tractor to induce the cut vines to discharge toward that side.

2. In a potato vine cutter of the type having a vertical shaft with a horizontal, radially extending blade mounted thereon, means for causing the cut potato vines to discharge at one side of said blade, comprising: a press plate positioned above said blade, said plate being higher at one side than the other so that the pressure on the cut vines will be slightly less at the higher side to cause them to discharge at this side.

LEE WELLS.
LEO C. FRY.

REFERENCES CITED

The following references are of record in the file of this patent:

UNITED STATES PATENTS

| Number | Name | Date |
|---|---|---|
| 2,187,833 | Lock et al. | Jan. 23, 1940 |
| 2,329,185 | Coddington | Sept. 14, 1943 |
| 2,359,358 | Dielschneider | Oct. 3, 1944 |
| 2,403,236 | Phelps | July 2, 1946 |